J. C. LUNDELL.
SWEEP ATTACHMENT.
APPLICATION FILED MAY 6, 1910.
983,629.
Patented Feb. 7, 1911.
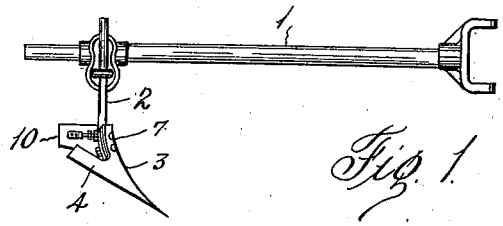
Fig. 1.
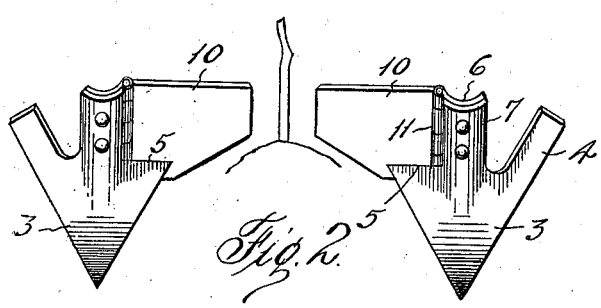
Fig. 2.
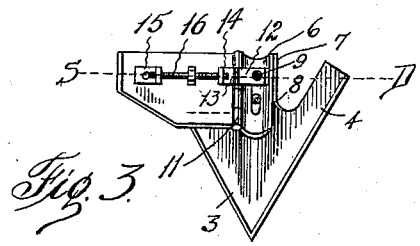
Fig. 3.
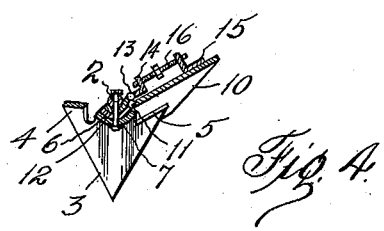
Fig. 4.
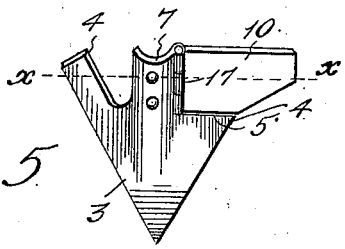
Fig. 5.
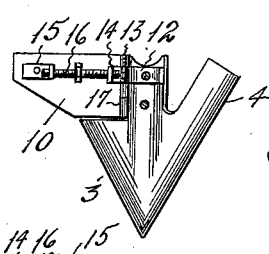
Fig. 6.
WITNESSES:
J. B. Bowling.
L. E. Noack.
Fig. 7.
INVENTOR
J. C. Lundell.
BY
Schley & Davis
ATTORNEYS.

UNITED STATES PATENT OFFICE.

JOHN C. LUNDELL, OF STAMFORD, TEXAS.

SWEEP ATTACHMENT.

983,629.

Specification of Letters Patent.  Patented Feb. 7, 1911.

Application filed May 6, 1910. Serial No. 559,767.

*To all whom it may concern:*

Be it known that I, JOHN C. LUNDELL, citizen of the United States, residing at Stamford, in the county of Jones and State of Texas, have invented certain new and useful Improvements in Sweep Attachments, of which the following is a specification.

This invention has relation to sweep attachments.

The object of the invention is to provide a wing adapted to be attached to a plow or cultivator sweep for "dirting" cotton plants at the last plowing, that is in plowing cotton, especially when plowing the cotton "shallow" it is desirable to throw the soil up and under the plants, thus covering the leaves, "squares" boll worms, and weevil, and also to nourish the plants.

Another object is ties in an adjustable arrangement whereby the wing may be adjusted and the level to which the soil is thrown, varied.

Finally the object of the invention is to provide means of the character described that will be strong, durable, efficient, and easy of operation, simple and comparatively inexpensive to construct, and also in which the several parts will not be likely to get out of working order.

With the above and other objects in view, the invention has relation to certain novel features of construction and operation, an example of which is described in this specification and illustrated in the accompanying drawings, wherein:

Figure 1. is a side elevation of a cultivator beam and sweep showing the invention attached thereto, Fig. 2. is a detail in elevation showing a pair of sweeps with wings attached thereto, Fig. 3. is a rear elevation of a sweep and the wing, Fig. 4. is a horizontal sectional view on the line S—D of Fig. 3, the parts being reversed, Fig. 5. is a front elevation of a sweep and wing inverted, Fig. 6. is a rear elevation of the same, and Fig. 7. is a horizontal sectional view on the line x—x of Fig. 5.

In the drawings the numeral 1 designates a cultivator beam, 2 the shank and 3 an ordinary sweep shovel having the sweeps 4.

In applying the invention one of the sweeps 4 of the shovel is cut off as indicated at 5. A curved supporting member 6 is provided and fitted against the rear side of the stem 7 of the shovel. This member bears against the shank 2 and is provided with a vertical slot 8 through which the foot bolts 9 pass and whereby the parts are fastened on the shank. By reason of the slot 8, the member 6 may be adjusted vertically with relation to the shovel. A laterally extending wing 10 is hinged at 11 to the vertical edge of the member 6 adjacent the cut off portion 5. This wing terminates substantially flush with the upper edge of the member 6 and projects a short distance below the edge 5, from adjacent which point, its lower edge is formed at an angle upward to the extreme outer edge of the wing. It is obvious that the wing 10 projects from the shovel toward the row as is illustrated in Fig. 2, and for holding the wing in position and adjusting it toward and away from the row in the arc of a circle having its center in the hinge 11, an adjustable connection is employed. This connection comprises a link 12 secured on one of the bolts 9 between the member 6 and the shank 2 and extending transversely of the member at its outer end the link is hinged at 13 to an angular bracket 14 which is free from the wing, but opposed to a corresponding angular bracket 15 secured on the rear side of the wing near its upper outer end. These brackets are connected and engaged by an oppositely threaded turn bolt 16. By turning this bolt, the connection is lengthened or shortened and the wing swung outward or inward.

In Figs. 5 to 7 inclusive a modified form is shown in which the parts are substantially the same except, the member 6 is omitted and the lower edge of the wing is free to swing over the edge 5 of the sweep. In this form the wing is hinged at 17 directly to the stem 7 of the shovel.

By observing Fig. 2 it will be seen that two shovels are employed, each with a wing, one on each side of the row and directed toward each other. These wings closing the angle between the stem and adjacent of the shovels through the soil, which would otherwise pass over the sweep, up and about the plants on each side. The height to which the soil is thrown about the plants or the level to which the row is raised may be governed by adjusting the wings.

It is to be understood that it is not the object of this invention to provide reversible wings or wings adjustable for hillside plowing, but on the other hand only one wing is employed and that on the row side for covering up young plants.

What I claim is:

1. The combination with a pair of cultivator sweep shovels spaced apart so as to travel in the furrows on each side of a row of plants, the sweep on the row-side of each shovel being cut off, of a pair of laterally extending wings directed toward each other from the shovels, each wing being hinged to its respective shovel and extending over and beyond the cut off sweep thereof a considerable distance, the lower edge of each wing being cut off at an angle and extending over the adjacent side of the row of plants, and an adjustable connection between each wing and its respective shovel.

2. The combination with a pair of cultivator sweep shovels spaced apart so as to travel in the furrows on each side of a row of plants, the sweep on the row-side of each shovel being cut off, and the stems of the shovels, of a curved member fitting in the rear side of each shovel stem, a pair of laterally extending wings directed toward each other and having their adjacent edges in close proximity, each wing having direct hinged connection with one of the curved members, the lower edges of the wings being cut off at a slight angle and extending beyond the cut off sweeps of the shovels, the curved member being slotted, and an adjusting connection for each wing comprising a link secured against the curved member, a bracket hinged to the link and free from the wing, a bracket secured to the wing, and an adjusting screw connecting the brackets.

In testimony whereof I have signed my name to this specification in the presence of two subscribing witnesses.

JOHN C. LUNDELL.

Witnesses:
C. L. CUNNINGHAM,
J. ELMER BROWN.